US012118340B2

(12) United States Patent
Patel

(10) Patent No.: US 12,118,340 B2
(45) Date of Patent: Oct. 15, 2024

(54) AUTOMATED MACHINE LEARNING MODEL DEPLOYMENT

(71) Applicant: International Business Machines Corporation, Armonk, NY (US)

(72) Inventor: Dhavalkumar C. Patel, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 81 days.

(21) Appl. No.: 17/947,859

(22) Filed: Sep. 19, 2022

(65) Prior Publication Data

US 2024/0095001 A1 Mar. 21, 2024

(51) Int. Cl.
*G06N 20/00* (2019.01)
*G06F 8/35* (2018.01)
(Continued)

(52) U.S. Cl.
CPC .............. *G06F 8/61* (2013.01); *G06F 8/35* (2013.01); *G06N 20/00* (2019.01); *G06F 9/50* (2013.01); *G06F 18/217* (2023.01); *G06N 3/08* (2013.01)

(58) Field of Classification Search
CPC . G06F 8/61; G06F 8/35; G06F 18/217; G06F 9/50; G06N 20/00; G06N 3/08
See application file for complete search history.

(56) References Cited

U.S. PATENT DOCUMENTS 10,803,392 B1 10/2020 Khan et al.
11,348,035 B2 * 5/2022 Vogeti ................. G06F 3/04842
(Continued)

FOREIGN PATENT DOCUMENTS

CN 109034394 A 12/2018
CN 109343857 A 2/2019
(Continued)

OTHER PUBLICATIONS

A. Huang et al., Integrating Distributed-Memory Machine Learning into Large-Scale HPC Simulations, Jun. 28, 2018, [Retrieved on Apr. 22, 2024]. Retrieved from the internet: <URL: https://www.osti.gov/servlets/purl/1460078> 54 Pages (1-52) (Year: 2018).*

(Continued)

*Primary Examiner* — Anibal Rivera
(74) *Attorney, Agent, or Firm* — Garg Law Firm, PLLC; Rakesh Garg; Nicholas Welling

(57) ABSTRACT

Using exported data of a machine learning model and a model training environment specification, a resource usage specification and a code module usage specification of the model are identified. A code module installation specification is determined from a code module requirements specification and a target execution environment specification. The code modules specified by the code module installation specification are caused to be installed in the target execution environment. Using data of the updated target execution environment, the updated target execution environment is validated for execution of the model. Execution of the model in the updated target execution environment is simulated. The model is deployed in the updated target execution environment responsive to the simulating being successful.

20 Claims, 7 Drawing Sheets

(51) Int. Cl.
*G06F 8/61* (2018.01)
*G06N 3/04* (2023.01)
*G06N 3/08* (2023.01)
*G06N 20/20* (2019.01)
G06F 9/50 (2006.01)
G06F 18/21 (2023.01)

(56) References Cited

U.S. PATENT DOCUMENTS

| | | | |
|---|---|---|---|
| 11,605,021 B1* | 3/2023 | Khare | G06N 5/046 |
| 2016/0148115 A1 | 5/2016 | Sirosh et al. | |
| 2017/0346755 A1* | 11/2017 | Caminiti | H04L 67/562 |
| 2020/0019882 A1 | 1/2020 | Garg et al. | |
| 2020/0034197 A1* | 1/2020 | Nagpal | G06F 9/50 |
| 2020/0327457 A1* | 10/2020 | Cmielowski | G06N 20/20 |
| 2022/0398462 A1* | 12/2022 | Clement | G06N 3/08 |
| 2022/0405619 A1* | 12/2022 | Ramamurthy | G06F 16/9024 |
| 2023/0105547 A1* | 4/2023 | Kamkar | G06Q 40/03 705/38 |

FOREIGN PATENT DOCUMENTS

| | | |
|---|---|---|
| CN | 111209013 A | 5/2020 |
| CN | 112650560 A | 4/2021 |
| CN | 112947960 A | 6/2021 |
| CN | 111917634 B | 7/2021 |
| CN | 113971032 B | 3/2022 |
| CN | 114565102 A | 5/2022 |

OTHER PUBLICATIONS

International Searching Authority, PCT/CN2023/098838, Aug. 23, 2023.

* cited by examiner

Fig. 4

EXAMPLE 400

| SR. NO. | ALGORITHMS | #PACKAGES_INSTALLED. | #NEW DEPLOYMENT TIME (SECONDS) | TIME FOR DEPLOYMENT (SECONDS) |
|---|---|---|---|---|
| 1 | LIGHTWEIGHT GBM | 1 | 54.7638070583435 | |
| 2 | PURE SKLEARN | NO_PACKAGE_INSTALLED | 41.0782794952392 | |
| 3 | XGBOOST | 1 | 64.6867561340332 | |
| 4 | SKLEARN + TSFRESH | 1 | 81.3080379962921 | |
| 5 | LIFELINE PACKAGE PIPELINE | 1 | 62.8307194709777 | |
| 6 | AUTOREG PIPELINE WITH MODEL BASED FEATURE GENERATOR + OTHER COMPONENT FROM SKLEARN | 1 | 61.3981347084045 | 118.4958484172821 |
| 7 | SUPPOSE USER ADD A NEW DEPENDENCY SUCH AS "MLXTEND" AND PUT IT AS A PART OF SKLEARN PIPELINE | RAISED EXCEPTION | | |
| 8 | TWO STEP PIPELINES<br>STEP1 – MODEL BASED FEATURES FROM XGBOOST<br>STEP2 – ANY REGRESSOR | 1 | 66.5569448471069 | |
| 9 | LGBM + TSFRESH + XGBOOST + LIFELINE | 4<br>['XGBOOST==0.90',<br>'LIFELINES==0.14.6',<br>'LIGHTGBM',<br>'TSFRESH==0.17.0'] | 100.0598769187927 | |

Fig. 5

EXAMPLE 500

| SR. NO. | PACKAGES | PACKAGE SIZE | INSTALLATION SIZE |
|---|---|---|---|
| 1 | PYTHON_CONTAINER | 163KB | 885MB |
| 2 | SROM CONTAINER | 10.8MB | 895MB |
| 3 | XGBOOST CONTAINER | 635MB | 1.14GB |
| 4 | LIFELINE CONTAINER | 253MB | 1.14GB |
| 5 | LGBM CONTAINER | 319MB | 1.2GB |
| 6 | TSFRESH_CONTAINER | 448MB | 1.33GB |
| 7 | COMPLETE CONTAINER | 1.18GB | 2.06GB |
| 8 | SCORING_CONTAINER | 1.18GB | 2.06GB |
| 9 | TRAINING_CONTAINER | 3.84GB | 4.73GB |

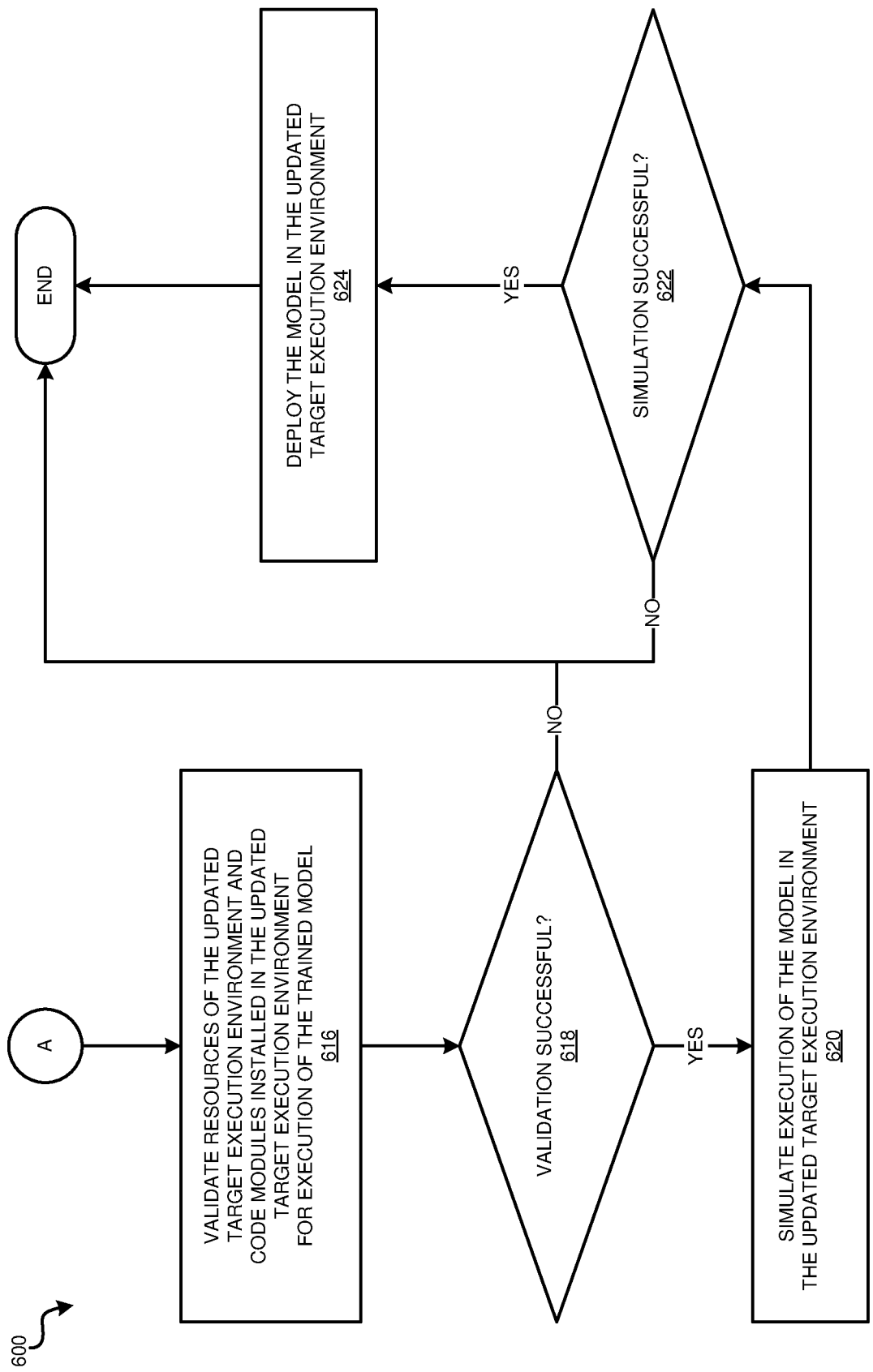

AUTOMATED MACHINE LEARNING MODEL DEPLOYMENT

BACKGROUND

The present invention relates generally to a method, system, and computer program product for software deployment. More particularly, the present invention relates to a method, system, and computer program product for automated machine learning model deployment.

A machine learning model is a model that learns to make predictions from input data. Typically, a machine learning model initially learns by applying one or more learning techniques to training data. Once the model meets one or more acceptance criteria (e.g., the accuracy of the model's output is above a threshold percentage), the model is considered sufficiently trained to be used for its intended purpose, on live (non-training) data. Model training can also continue after the model is placed in production, however. A machine learning model that operates on a stream of incoming data is also referred to as a machine learning pipeline or simply a pipeline.

A machine learning model is typically trained and evaluated in a model training environment. Human developers who are familiar with model development and training typically supervise model training and evaluation. Once the model is performing as desired, the model is deployed. Machine learning model deployment is the process of placing a trained machine learning model into a production environment where the model is to be used for its intended purpose, on live (non-training) data. Machine learning model deployment typically requires data of the model itself, data of the training environment in which the model was trained, and data of a production environment in which the model is to be deployed.

SUMMARY

The illustrative embodiments provide a method, system, and computer program product. An embodiment includes a method that identifies, using exported data of a machine learning model and a model training environment specification, a resource usage specification of the model and a code module usage specification of the model, the resource usage specification specifying a set of resources used in training the model in a model training environment specified by the model training environment specification, the code module usage specification specifying a set of code modules used in training the model in the model training environment. An embodiment determines, from a code module requirements specification and a target execution environment specification, a code module installation specification, the code module requirements specification specifying a set of code modules required to execute the model, the code module installation specification specifying a set of code modules to be installed in a target execution environment, the target execution environment comprising an environment for execution of the model, the target execution environment specified by the target execution environment specification. An embodiment causes installing of, in the target execution environment, the code modules specified by the code module installation specification, the installing resulting in an updated target execution environment. An embodiment validates, using data of the updated target execution environment, the updated target execution environment for execution of the model. An embodiment simulates execution of the model in the updated target execution environment. An embodiment deploys, in the updated target execution environment responsive to the simulating being successful, the model.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 4 depicts example results of automated machine learning model deployment in accordance with an illustrative embodiment;

FIG. 5 depicts example results of automated machine learning model deployment in accordance with an illustrative embodiment;

FIG. 6B depicts a continued flowchart of an example process for automated machine learning model deployment in accordance with an illustrative embodiment;

DETAILED DESCRIPTION

Figure 1:
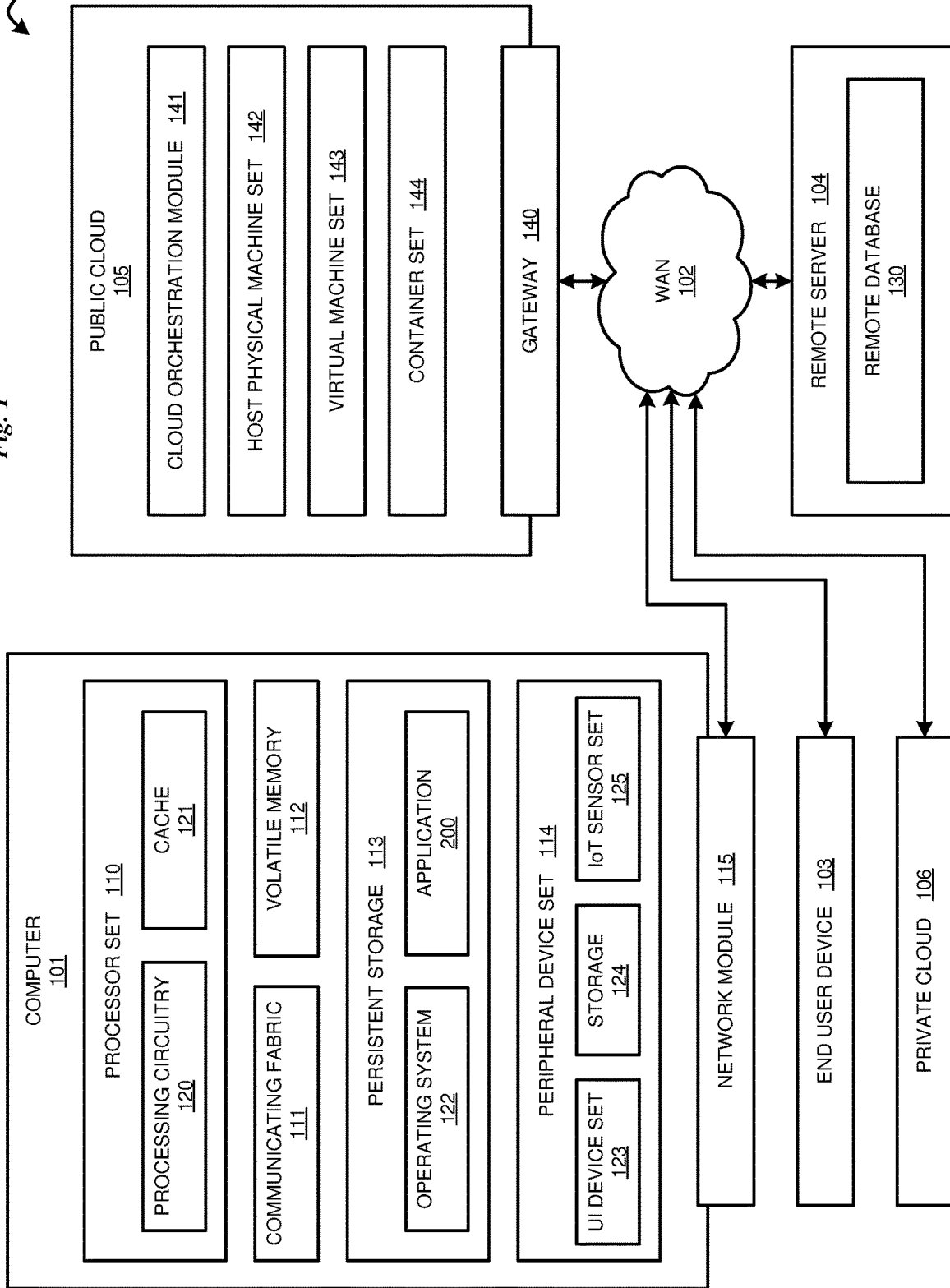
FIG. 1 depicts an example diagram of a data processing environments in which illustrative embodiments may be implemented.

The illustrative embodiments recognize that, while tools are presently available to automatically configure and train machine learning models, tools that automatically deploy a machine learning model are not presently available. Further, deployment is more complex than simply copying an application file from one location to another and starting execution in the new location. Presently available automated model development tools typically build a custom model by combining existing components. Often, the tools explore different model architectures before selecting the best-performing model. As a result, models have diverse architectures and use components, or code modules, from a diverse set of existing software libraries or software packages. For example, some common libraries in the Python computer language are sklearn, xgboost, tsfresh, and lifeline. (Python is registered trademark of the Python Software Foundation in the United States and other countries.) The needed software libraries must be installed in an environment in which the model is to execute, or the model will not function correctly. However, the automated tools do not typically identify required software libraries, and dependencies between components can be difficult for a human end user, deploying the model, who is unfamiliar with details of each individual model being deployed to keep track of. In addition, other resources, such as processors and memory, must also be sufficient for the model and its software libraries to function with specified speed as well as accuracy. For example, a model trained to monitor and adjust wind turbine operations according to changing environmental conditions, but reacts too slowly to an incoming storm, could cause the turbine to be damaged by the storm. Some mission-critical applications are required to have a certification that a model meets particular speed or response requirements in a particular execution environment. Thus, different models are likely to have different, non-standard, deployment environment requirements which are difficult for humans to evaluate. As well, determining why a model operating in an environment that is incorrectly configured for the model has failed to deploy or operate correctly can be difficult and time-consuming, especially for an end user who is unfamiliar with model details.

The illustrative embodiments recognize that one solution is to duplicate a model's training environment in a production environment, as the training environment is known to have sufficient resources and the correct software libraries already present. However, because model training is typically more resource-intensive than simply using the trained model, a training environment often includes resources and the software libraries that are unnecessary in a deployment environment. For example, a model might be trained using 64 processors and 16 gigabytes of memory, but once trained might only require four processors and four gigabytes of memory. Allocating unused resources and installing unused libraries is inefficient. Allocating unused resources and installing unused libraries also adds unneeded expense in environments in which these services are charged for individually.

The illustrative embodiments also recognize that model users have a variety of platforms on which models can be deployed, with different characteristics. One platform allows users to customize the model execution environment, while another offers more than forty default environment configurations which are further customizable. In addition, for speed, data security, or other reasons some users prefer that the model and the data processed by the model operate in the same environment, on the same physical system, or in the same data center. However, because different models have different deployment environment requirements, it is difficult for a human end user who is unfamiliar with model details to optimize a selected deployment environment to a particular model. The illustrative embodiments also recognize that, while existing deployment tools typically test model accuracy, the tools do not test model speed or response time or perform validation and testing of the model for execution in a selected deployment environment.

Thus, the illustrative embodiments recognize that there is an unmet need for an automated tool that determines a model's requirements when executing in production (rather than training), selects a suitable deployment environment, validates and tests the model for execution as specified in the deployment environment, and deploys the model, all in an automated, standardized fashion.

The illustrative embodiments recognize that the presently available tools or solutions do not address these needs or provide adequate solutions for these needs. The illustrative embodiments used to describe the invention generally address and solve the above-described problems and other problems related to automated machine learning model deployment.

An embodiment can be implemented as a software application. The application implementing an embodiment can be configured as a modification of an existing machine learning model management or execution system, as a separate application that operates in conjunction with an existing machine learning model management or execution system, a standalone application, or some combination thereof.

Particularly, some illustrative embodiments provide a method that identifies a resource usage and a code module usage specification of an exported model, determines a code module installation specification, causes installing of the code modules specified by the code module installation specification in the target execution environment, validates the updated target execution environment for execution of the trained model, simulates execution of the model in the updated target execution environment, and deploys the model in the updated target execution environment responsive to the simulating being successful.

An embodiment receives exported data of a trained machine learning model to be deployed and an environment specification for an environment in which the model was trained. The data of the trained machine learning model contains all the model data necessary to execute the model in another execution environment. Several presently available automated model training tools (e.g., AutoAI, a presently available tool that automates steps in building predictive machine learning models) include a model export capability that generates the exported data. An embodiment also receives an environment specification for an environment in which the model was trained. An embodiment specification specifies characteristics of the model training environment, for example the number of processors, the amount of memory, and the software modules installed in the environment.

An embodiment uses exported data of a trained machine learning model to be deployed and an environment specification for an environment in which the model was trained to identify a resource usage specification. A resource usage specification specifies a set of resources of the model training environment. Some non-limiting examples of resources of the model training environment are the number and speed of processors, the amount of memory, and the number, architecture, and speed of any graphics processors used to supplement processors with specialized computations. For example, one resource usage specification might specify that the model training environment had 64 processors and 16 gigabytes of memory.

An embodiment uses exported data of a trained machine learning model to be deployed and an environment specification for an environment in which the model was trained to identify a code module usage specification of the model. The code usage specification specifies a set of code modules, or libraries, present in the model training environment, as well as a version number of each code module if available. For example, one code usage specification might specify that the training environment included version 1.0 of the scikit-learn Python library.

Because not every code module present in the model training environment is required to execute the model, an embodiment analyzes the exported data to prune the code module usage specification, removing one or more code modules that are not actually required. The pruning results in a code module requirements specification specifying a set of code modules required to execute the model in an execution environment. To prune the code module usage specification, an embodiment generates control flow data of the model, and uses the control flow data to trace usage of specific code modules as the model executed in the training environment. Only code module actually used during model execution remain in the code module requirements specification. To generate control flow data of an exported model implemented in the Python language, one embodiment uses a presently available Python tool (e.g., ast) to generate an abstract syntax tree, a record of the Python interpreter's interpretation of a Python program's source code that includes control flow data of the program. Techniques to generate control flow data of an exported model in other computer languages are also presently available.

An embodiment uses the model training environment specification to select a target execution environment. A target execution environment is an environment to which the model will be deployed for execution on live (non-training) data. The target execution environment is specified by a target execution environment specification. The target execution environment need not have the same resources, code modules, or versions of code modules as the training execution environment. In embodiments, the target execution environment has fewer processors, less memory, or a different graphics processor architecture than the training execution environment. In embodiments, the target execution environment is missing a code module that is present in the training execution environment, or has an older version of a code module than the training execution environment. In one embodiment, a user provides the target execution environment specification. For example, a wind turbine monitoring model might be required to execute in the same environment as the environment collecting the wind turbine data the model will process, and reconfiguring the data collection environment would require the addition or replacement of particular physical components. In another embodiment, a user provides a preference or constraint (e.g., specifying the provider of the target execution environment, or that the target execution environment be located in a particular country or data center), and the embodiment selects a target execution environment meeting the preference or constraint. Another embodiment selects a target execution environment without user input. To select a target execution environment, an embodiment analyzes data of one or more available execution environments, and ranks the environments according to one or more of the time to install an additional component, the additional memory required if unable to remove an existing package, the frequency at which a library version changes, and the cost of making required resources available in the execution environment. The embodiment then selects the highest-ranked available environment.

An embodiment determines a code module installation specification from the target execution environment specification and the code module requirements specification. The code module installation specification specifies a set of code modules to be installed in the target execution environment. In particular, an embodiment compares data of the code modules currently installed in the target execution environment (specified by the target execution environment specification, or obtained separately from the target environment specified by the target execution environment specification) with data of the code modules required to be installed in the target execution environment (specified by the code module requirements specification). The embodiment adds any code modules not already installed, or installed but with earlier versions), to the code module installation specification.

An embodiment causes installation of one or more code modules specified by the code module installation specification in the target execution environment. The installing updates the target execution environment. In one embodiment, code module installation is performed only after determining that installing a code module will not cause the target execution environment to exceed a resource limit specified by the target execution environment specification. For example, installing a large code module in an environment already close to running out of memory might cause the environment to indeed run out of memory, which is not desirable. If an embodiment determines that installing a code module will cause the target execution environment to exceed a resource limit, or if an error occurs during installation, an embodiment informs a user, selects another target execution environment and repeats determining the code module installation specification and installation in that environment, or takes another remedial action.

An embodiment also adjusts the resource usage specification, the code module installation specification, or both to specify fewer resources or code modules, or different versions of code modules, than originally specified. Typically, a deployed model requires fewer resources and code modules than a model be trained, and adjusting target environment requirements to more closely align with what a deployed model actually requires allows for more efficient computing resource usage and saves money.

An embodiment uses the resource usage specification and data of the updated target execution environment to validate resources of the updated target execution environment for execution of the trained model. An embodiment also uses the code module installation specification and data of the updated target execution environment to validate code modules of the updated target execution environment for execution of the trained model. The validating checks that the target execution environment has sufficient resources, and that the code modules are installed and have the correct versions, to execute the trained model. Validating before model deployment avoids some sources of model deployment failure and thus avoids the necessity to debug such failures, particularly in non-standard execution environments.

An embodiment simulates execution of the model in the updated target execution environment. The simulating checks that the model executes correctly in a simulated version of the target execution environment. Simulating before model deployment avoids some sources of model deployment failure and thus avoids the necessity to debug such failures, particularly in non-standard execution environments. To perform the simulation, an embodiment uses a presently available technique.

If the simulation fails due to an error, or does not meet a specified performance specification, an embodiment readjusts the resource usage specification, the code module installation specification, or both to specify additional resources or code modules, or different versions of code modules, and repeats the validation and simulation using the readjusted specification(s).

On the other hand, if the simulation is successful, an embodiment deploys the model in the updated target execution environment. Once deployed, the model executes in the updated target execution environment and is able to process live data. To perform the deployment, an embodiment uses a presently available technique.

An embodiment maintains a record of deployments, including exported data of a trained machine learning model to be deployed, an environment specification for an environment in which the model was trained, the target execution environment, adjustments made to the target execution environment, and validation, simulation, and deployment results. The record is usable to adjust one or more methods described herein.

The manner of automated machine learning model deployment described herein is unavailable in the presently available methods in the technological field of endeavor pertaining to machine learning model management. A method of an embodiment described herein, when implemented to execute on a device or data processing system, comprises substantial advancement of the functionality of that device or data processing system in identifying a resource usage and a code module usage specification of an exported model, determining a code module installation specification, causing installing of the code modules specified by the code module installation specification in the target execution environment, validating the updated target execution environment for execution of the trained model, simulating execution of the model in the updated target execution environment, and deploying the model in the updated target execution environment responsive to the simulating being successful.

The illustrative embodiments are described with respect to certain types of execution environments, resources, code modules, computer languages, specifications, models, validations, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to the figures and in particular with reference to FIG. 1, this figure is an example diagram of a data processing environments in which illustrative embodiments may be implemented. FIG. 1 is only an example and are not intended to assert or imply any limitation with regard to the environments in which different embodiments may be implemented. A particular implementation may make many modifications to the depicted environments based on the following description. FIG. 1 depicts a block diagram of a network of data processing systems in which illustrative embodiments may be implemented. Computing environment 100 contains an example of an environment for the execution of at least some of the computer code involved in performing the inventive methods, such as application 200. Application 200 implements an automated machine learning model deployment embodiment described herein. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Application 200 executes in any of computer 101, end user device 103, remote server 104, or a computer in public cloud 105 or private cloud 106 unless expressly disambiguated. Application 200 can deploy a model in any of computer 101, end user device 103, remote server 104, or a computer in public cloud 105 or private cloud 106, or another environment.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processor set 110 may contain one or more processors and may be implemented using one or more heterogeneous processor systems. A processor in processor set 110 may be a single- or multi-core processor or a graphics processor. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Operating system 122 runs on computer 101. Operating system 122 coordinates and provides control of various components within computer 101. Instructions for operating system 122 are located on storage devices, such as persistent storage 113, and may be loaded into at least one of one or more memories, such as volatile memory 112, for execution by processor set 110.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of application 200 may be stored in persistent storage 113 and may be loaded into at least one of one or more memories, such as volatile memory 112, for execution by processor set 110. The processes of the illustrative embodiments may be performed by processor set 110 using computer implemented instructions, which may be located in a memory, such as, for example, volatile memory 112, persistent storage 113, or in one or more peripheral devices in peripheral device set 114. Furthermore, in one case, application 200 may be downloaded over WAN 102 from remote server 104, where similar code is stored on a storage device. In another case, application 200 may be downloaded over WAN 102 to remote server 104, where downloaded code is stored on a storage device.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in application 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, user interface (UI) device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. Internet of Things (IoT) sensor set 125 is made up of sensors that can be used in IoT applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

Wide area network (WAN) 102 is any WAN (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
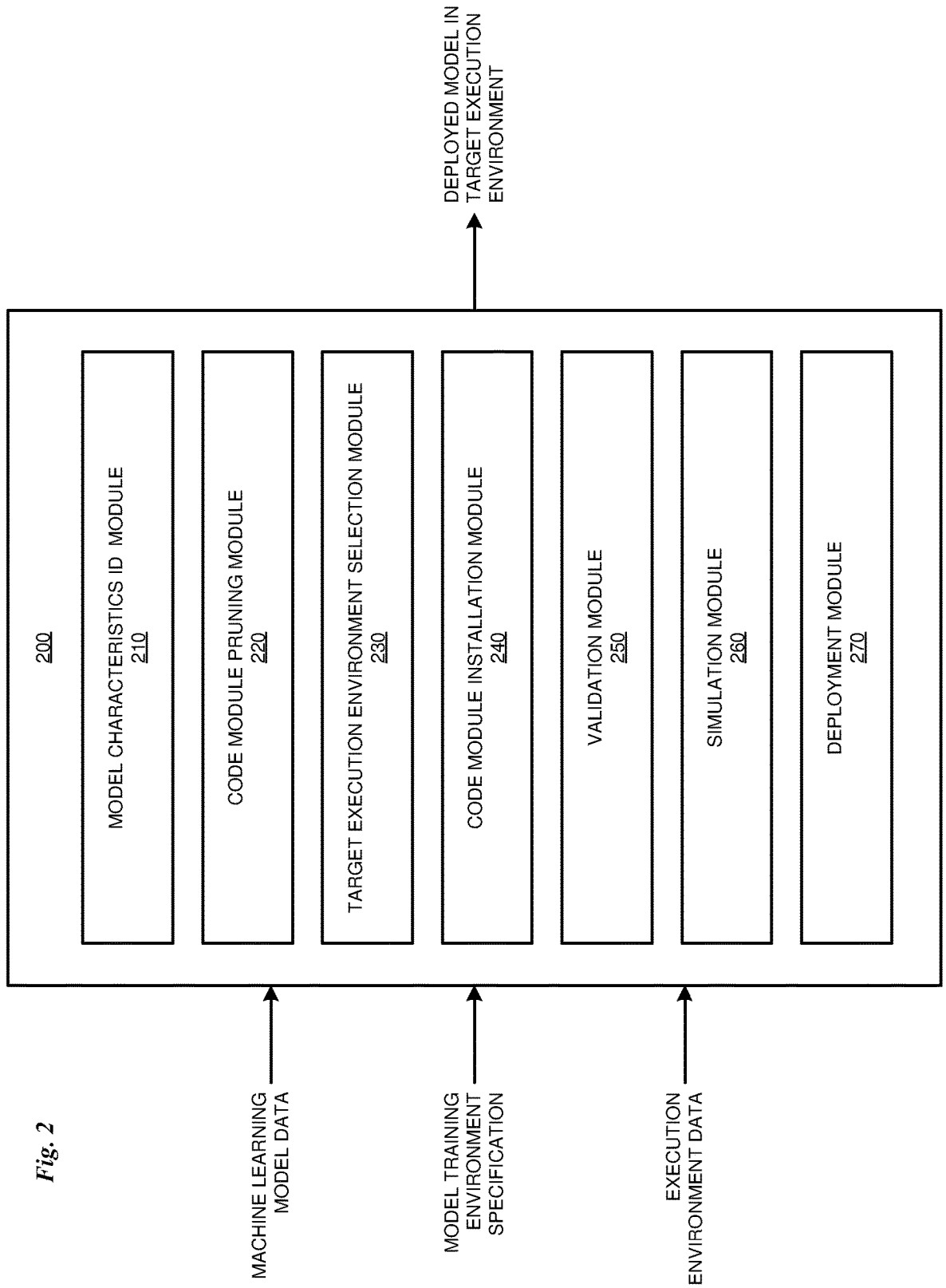
FIG. 2 depicts a block diagram of an example configuration for automated machine learning model deployment in accordance with an illustrative embodiment.

With reference to FIG. 2, this figure depicts a block diagram of an example configuration for automated machine learning model deployment in accordance with an illustrative embodiment. Application 200 is the same as application 200 in FIG. 1.

Application 200 receives exported data of a trained machine learning model to be deployed and an environment specification for an environment in which the model was trained. The data of the trained machine learning model contains all the model data necessary to execute the model in another execution environment. Application 200 also receives an environment specification for an environment in which the model was trained. An embodiment specification specifies characteristics of the model training environment, for example the number of processors, the amount of memory, and the software modules installed in the environment.

Model characteristics identification module 210 uses exported data of a trained machine learning model to be deployed and an environment specification for an environment in which the model was trained to identify a resource usage specification. A resource usage specification specifies a set of resources of the model training environment. Some non-limiting examples of resources of the model training environment are the number and speed of processors, the amount of memory, and the number, architecture, and speed of any graphics processors used to supplement processors with specialized computations. For example, one resource usage specification might specify that the model training environment had 64 processors and 16 gigabytes of memory.

Module 210 also uses exported data of a trained machine learning model to be deployed and an environment specification for an environment in which the model was trained to identify a code module usage specification of the model. The code usage specification specifies a set of code modules, or libraries, present in the model training environment, as well as a version number of each code module if available. For example, one code usage specification might specify that the training environment included version 1.0 of the scikit-learn Python library.

Because not every code module present in the model training environment is required to execute the model, code module pruning module 220 analyzes the exported data to prune the code module usage specification, removing one or more code modules that are not actually required. The pruning results in a code module requirements specification specifying a set of code modules required to execute the model in an execution environment. To prune the code module usage specification, module 220 generates control flow data of the model, and uses the control flow data to trace usage of specific code modules as the model executed in the training environment. Only code module actually used during model execution remain in the code module requirements specification. To generate control flow data of an exported model implemented in the Python language, one implementation of module 220 uses a presently available Python tool (e.g., ast) to generate an abstract syntax tree, a record of the Python interpreter's interpretation of a Python program's source code that includes control flow data of the program.

Target execution environment selection module 230 uses the model training environment specification to select a target execution environment. A target execution environment is an environment to which the model will be deployed for execution on live (non-training) data. The target execution environment is specified by a target execution environment specification. The target execution environment need not have the same resources, code modules, or versions of code modules as the training execution environment. In implementations of module 230, the target execution environment has fewer processors, less memory, or a different graphics processor architecture than the training execution environment. In implementations of module 230, the target execution environment is missing a code module that is present in the training execution environment, or has an older version of a code module than the training execution environment. In one implementation of module 230, a user provides the target execution environment specification. For example, a wind turbine monitoring model might be required to execute in the same environment as the environment collecting the wind turbine data the model will process, and reconfiguring the data collection environment would require the addition or replacement of particular physical components. In another implementation of module 230, a user provides a preference or constraint (e.g., specifying the provider of the target execution environment, or that the target execution environment be located in a particular country or data center), and the implementation selects a target execution environment meeting the preference or constraint. Another implementation of module 230 selects a target execution environment without user input. To select a target execution environment, module 230 analyzes data of one or more available execution environments, and ranks the environments according to one or more of the time to install an additional component, the additional memory required if unable to remove an existing package, the frequency at which a library version changes, and the cost of making required resources available in the execution environment. Module 230 then selects the highest-ranked available environment.

Code module installation module 240 determines a code module installation specification from the target execution environment specification and the code module requirements specification. The code module installation specification specifies a set of code modules to be installed in the target execution environment. In particular, module 240 compares data of the code modules currently installed in the target execution environment (specified by the target execution environment specification, or obtained separately from the target environment specified by the target execution environment specification) with data of the code modules required to be installed in the target execution environment (specified by the code module requirements specification). Module 240 adds any code modules not already installed, or installed but with earlier versions), to the code module installation specification.

Code module installation module 240 also causes installation of one or more code modules specified by the code module installation specification in the target execution environment. The installing updates the target execution environment. In one implementation of module 240, code module installation is performed only after determining that installing a code module will not cause the target execution environment to exceed a resource limit specified by the target execution environment specification. For example, installing a large code module in an environment already close to running out of memory might cause the environment to indeed run out of memory, which is not desirable. If module 240 determines that installing a code module will cause the target execution environment to exceed a resource limit, or if an error occurs during installation, module 240 informs a user, selects another target execution environment and repeats determining the code module installation specification and installation in that environment, or takes another remedial action.

Application 200 also adjusts the resource usage specification, the code module installation specification, or both to specify fewer resources or code modules, or different versions of code modules, than originally specified. Typically, a deployed model requires fewer resources and code modules than a model be trained, and adjusting target environment requirements to more closely align with what a deployed model actually requires allows for more efficient computing resource usage and saves money.

Validation module 250 uses the resource usage specification and data of the updated target execution environment to validate resources of the updated target execution environment for execution of the trained model. Module 250 also uses the code module installation specification and data of the updated target execution environment to validate code modules of the updated target execution environment for execution of the trained model. The validating checks that the target execution environment has sufficient resources, and that the code modules are installed and have the correct versions, to execute the trained model. Validating before model deployment avoids some sources of model deployment failure and thus avoids the necessity to debug such failures, particularly in non-standard execution environments.

Simulation module 260 simulates execution of the model in the updated target execution environment. The simulating checks that the model executes correctly in a simulated version of the target execution environment. Simulating before model deployment avoids some sources of model deployment failure and thus avoids the necessity to debug such failures, particularly in non-standard execution environments.

If the simulation fails due to an error, or does not meet a specified performance specification, application 200 readjusts the resource usage specification, the code module installation specification, or both to specify additional resources or code modules, or different versions of code modules, and repeats the validation and simulation using the readjusted specification(s).

On the other hand, if the simulation is successful, deployment module 270 deploys the model in the updated target execution environment. Once deployed, the model executes in the updated target execution environment and is able to process live data.

Figure 3:
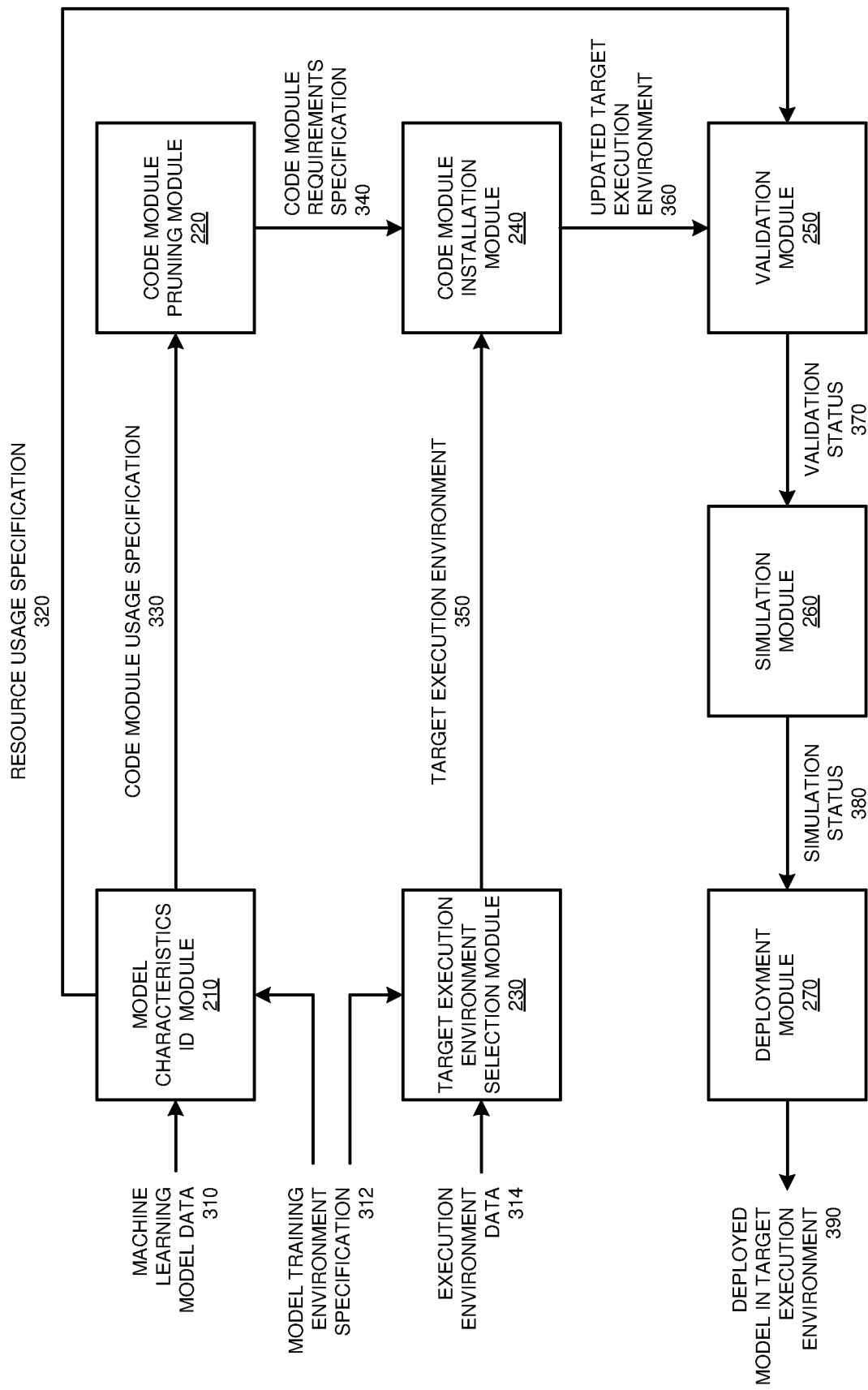
FIG. 3 depicts an example of automated machine learning model deployment in accordance with an illustrative embodiment.

With reference to FIG. 3, this figure depicts an example of automated machine learning model deployment in accordance with an illustrative embodiment. The example can be executed using application 200 in FIG. 1. Model characteristics identification module 210, code module pruning module 220, target execution environment selection module 230, code module installation module 240, validation module 250, simulation module 260, and deployment module 270 are the same as model characteristics identification module 210, code module pruning module 220, target execution environment selection module 230, code module installation module 240, validation module 250, simulation module 260, and deployment module 270 in FIG. 2.

As depicted, model characteristics identification module 210 uses machine learning model data 310 (exported data of a trained machine learning model to be deployed) and model training environment specification 312 (specifying an environment in which the model was trained) to identify resource usage specification 320. Module 210 also uses machine learning model data 310 and model training environment specification 312 to identify code module usage specification 330.

Code module pruning module 220 prunes code module usage specification 330, removing one or more code modules that are not actually required. The pruning results in code module requirements specification 340, specifying a set of code modules required to execute the model in an execution environment.

Target execution environment selection module 230 uses model training environment specification 312 and execution environment data 314 to select target execution environment 350. Code module installation module 240 determines a code module installation specification from target execution environment specification 350 and code module requirements specification 340. Code module installation module 240 also causes installation of one or more code modules specified by the code module installation specification in the target execution environment, resulting in updated target execution environment 360.

Validation module 250 uses resource usage specification 330 and data of updated target execution environment 360 to validate resources of the updated target execution environment for execution of the trained model. Module 250 also uses the code module installation specification and data of updated target execution environment 360 to validate code modules of the updated target execution environment for execution of the trained model. The result is validation status 370.

If validation status 370 is successful, simulation module 260 simulates execution of the model in the updated target execution environment. The result is simulation status 380. If simulation status 380 is successful, deployment module 270 deploys the model in the updated target execution environment (390).

With reference to FIG. 4, this figure depicts example results of automated machine learning model deployment in accordance with an illustrative embodiment.

In particular, example 400 depicts a table, in which each row represents one scenario of deploying a machine learning pipeline, or model, using different execution environment configurations. The leftmost column holds a number corresponding to each different scenario, and the Algorithms column (second from left) holds algorithms used in the machine learning model. The pipeline can include components from multiple libraries and the Packages Installed column (third from left) indicates how many new libraries were required to be installed in the target execution environment. In some scenarios, no new libraries were installed (e.g., scenario 2), and in some cases (e.g., scenario 7) an exception was raised due to a library installation error. The New Deployment Time column (second from right) reports the time taken to prepare the target execution environment and make it available for usage by a model. The rightmost column indicates the time taken by a presently available technique, thus show benefits of decreased deployment time using an embodiment of the present invention.

With reference to FIG. 5, this figure depicts example results of automated machine learning model deployment in accordance with an illustrative embodiment.

In particular, example 500 depicts a table, in which each row represents one scenario of deploying a machine learning pipeline, or model, using different execution environment configurations. The leftmost column holds a number corresponding to each different scenario, and the scenarios are the same as those depicted in example 400 in FIG. 4. Since different machine learning models have different dependencies, the Packages column names a model package, the Package Size column reports a package size for a deployed model, and the Installation Size column reports the total memory used when the model was deployed.

Figure 6A:
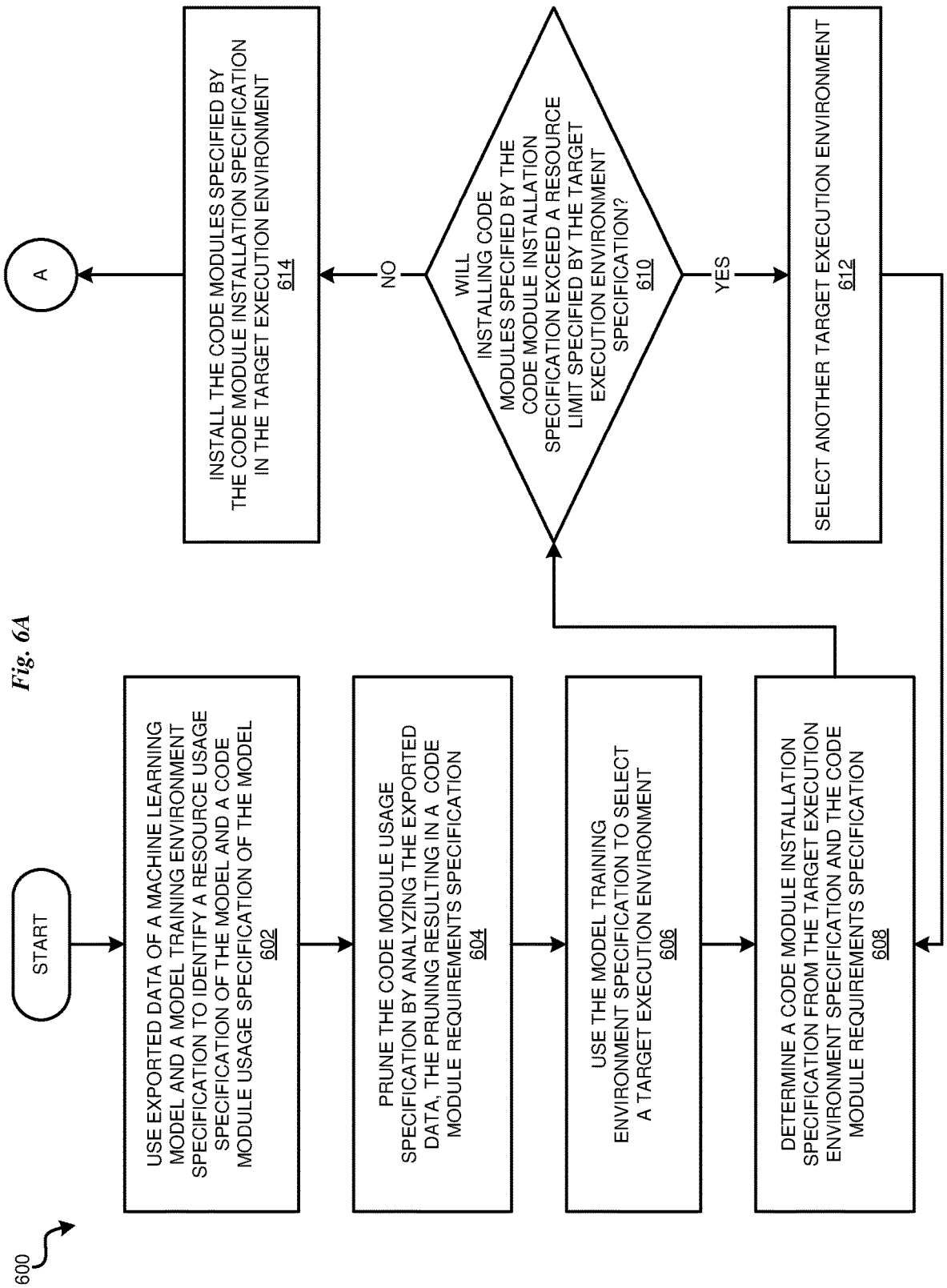
FIG. 6A depicts a flowchart of an example process for automated machine learning model deployment in accordance with an illustrative embodiment.

With reference to FIG. 6A, this figure depicts a flowchart of an example process for automated machine learning model deployment in accordance with an illustrative embodiment. Process 600 can be implemented in application 200 in FIG. 2.

In block 602, the application uses exported data of a machine learning model and a model training environment specification to identify a resource usage specification of the model and a code module usage specification of the model. In block 604, the application prunes the code module usage specification by analyzing the exported data, the pruning resulting in a code module requirements specification. In block 606, the application uses the model training environment specification to select a target execution environment. In block 608, the application determines a code module installation specification from the target execution environment specification and the code module requirements specification. In block 610, the application checks whether installing code modules specified by the code module installation specification will exceed a resource limit specified by the target execution environment specification. If yes ("YES" path of block 610), in block 612, the application selects another target execution environment and returns to block 608. Otherwise ("NO" path of block 610), in block 614 the application installs the code modules specified by the code module installation specification in the target execution environment. Then the application proceeds to point A.

With reference to FIG. 6B, this figure depicts a continued flowchart of an example process for automated machine learning model deployment in accordance with an illustrative embodiment. In particular, FIG. 6B depicts a continuation of process 600 in FIG. 6A. Point A is the same as point A in FIG. 6A.

From point A, in block 616 the application validates resources of the updated target execution environment and code modules installed in the updated target execution environment for execution of the trained model. In block 618, the application checks whether the validation was successful. If yes ("YES" path of block 618, in block 620 the application simulates execution of the model in the updated target execution environment. In block 622, the application checks whether the simulation was successful. If yes ("YES" path of block 622, in block 624 the application deploys the model in the updated target execution environment. Then (also "NO" paths of blocks 618 and 622) the application ends.

Thus, a computer implemented method, system or apparatus, and computer program product are provided in the illustrative embodiments for automated machine learning model deployment and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   identifying, using exported data of a machine learning model and a model training environment specification, a resource usage specification of the machine learning model and a code module usage specification of the machine learning model, the resource usage specification specifying a set of resources used in training the machine learning model in a model training environment specified by the model training environment specification, the code module usage specification specifying a set of code modules used in training the machine learning model in the model training environment;
   determining, from a code module requirements specification and a target execution environment specification, a code module installation specification, the code module requirements specification specifying a set of code modules required to execute the machine learning model, the code module installation specification specifying a set of code modules to be installed in a target execution environment, the target execution environment comprising an environment for execution of the machine learning model, the target execution environment specified by the target execution environment specification;
   causing installing of, in the target execution environment, the code modules specified by the code module installation specification, the installing resulting in an updated target execution environment;
   validating, using data of the updated target execution environment, the updated target execution environment for execution of the machine learning model;
   simulating execution of the machine learning model in the updated target execution environment; and
   deploying, in the updated target execution environment responsive to the simulating being successful, the machine learning model.

2. The computer-implemented method of claim 1, wherein the machine learning model is trained in a training execution environment.

3. The computer-implemented method of claim 2, wherein the training execution environment includes at least one resource that is not included in the target execution environment.

4. The computer-implemented method of claim 2, wherein the training execution environment includes at least one code module that is not included in the target execution environment.

5. The computer-implemented method of claim 1, further comprising:
   pruning, by analyzing the exported data, the code module usage specification, the pruning resulting in the code module requirements specification.

6. The computer-implemented method of claim 1, wherein the installing is performed responsive to determining that installing the code modules specified by the code module installation specification will not exceed a resource limit specified by the target execution environment specification.

7. The computer-implemented method of claim 1, wherein validating the updated target execution environment for execution of the machine learning model comprises:
   validating, using the resource usage specification of the machine learning model, resources of the updated target execution environment for execution of the machine learning model.

8. The computer-implemented method of claim 1, wherein validating the updated target execution environment for execution of the machine learning model comprises:
   validating, using the code module installation specification, code modules installed in the updated target execution environment for execution of the machine learning model.

9. A computer program product comprising one or more computer readable storage medium, and program instructions collectively stored on the one or more computer readable storage medium, the program instructions executable by a processor to cause the processor to perform operations comprising:
   identifying, using exported data of a machine learning model and a model training environment specification, a resource usage specification of the machine learning model and a code module usage specification of the machine learning model, the resource usage specification specifying a set of resources used in training the machine learning model in a model training environment specified by the model training environment specification, the code module usage specification specifying a set of code modules used in training the machine learning model in the model training environment;
   determining, from a code module requirements specification and a target execution environment specification, a code module installation specification, the code module requirements specification specifying a set of code modules required to execute the machine learning model, the code module installation specification specifying a set of code modules to be installed in a target execution environment, the target execution environment comprising an environment for execution of the machine learning model, the target execution environment specified by the target execution environment specification;

causing installing of, in the target execution environment, the code modules specified by the code module installation specification, the installing resulting in an updated target execution environment;

validating, using data of the updated target execution environment, the updated target execution environment for execution of the machine learning model;

simulating execution of the machine learning model in the updated target execution environment; and deploying, in the updated target execution environment responsive to the simulating being successful, the machine learning model.

10. The computer program product of claim 9, wherein the stored program instructions are stored in a computer readable storage device in a data processing system, and wherein the stored program instructions are transferred over a network from a remote data processing system.

11. The computer program product of claim 9, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

12. The computer program product of claim 9, wherein the machine learning model is trained in a training execution environment.

13. The computer program product of claim 12, wherein the training execution environment includes at least one resource that is not included in the target execution environment.

14. The computer program product of claim 12, wherein the training execution environment includes at least one code module that is not included in the target execution environment.

15. The computer program product of claim 9, further comprising:

pruning, by analyzing the exported data, the code module usage specification, the pruning resulting in the code module requirements specification.

16. The computer program product of claim 9, wherein the installing is performed responsive to determining that installing code modules specified by the code module installation specification will not exceed a resource limit specified by the target execution environment specification.

17. The computer program product of claim 9, wherein validating the updated target execution environment for execution of the machine learning model comprises:

validating, using a resource usage specification of the machine learning model, resources of the updated target execution environment for execution of the machine learning model.

18. The computer program product of claim 9, wherein validating the updated target execution environment for execution of the machine learning model comprises:

validating, using the code module installation specification, code modules installed in the updated target execution environment for execution of the machine learning model.

19. A computer system comprising a processor and one or more computer readable storage media, and program instructions collectively stored on the one or more computer readable storage media, the program instructions executable by the processor to cause the processor to perform operations comprising:

identifying, using exported data of a machine learning model and a model training environment specification, a resource usage specification of the machine learning model and a code module usage specification of the machine learning model, the resource usage specification specifying a set of resources used in training the machine learning model in a model training environment specified by the model training environment specification, the code module usage specification specifying a set of code modules used in training the machine learning model in the model training environment;

determining, from a code module requirements specification and a target execution environment specification, a code module installation specification, the code module requirements specification specifying a set of code modules required to execute the machine learning model, the code module installation specification specifying a set of code modules to be installed in a target execution environment, the target execution environment comprising an environment for execution of the machine learning model, the target execution environment specified by the target execution environment specification;

causing installing of, in the target execution environment, the code modules specified by the code module installation specification, the installing resulting in an updated target execution environment;

validating, using data of the updated target execution environment, the updated target execution environment for execution of the machine learning model;

simulating execution of the machine learning model in the updated target execution environment; and deploying, in the updated target execution environment responsive to the simulating being successful, the machine learning model.

20. The computer system of claim 19, wherein the machine learning model is trained in a training execution environment.

* * * * *